United States Patent
Murakami et al.

(10) Patent No.: US 10,417,746 B2
(45) Date of Patent: Sep. 17, 2019

(54) IMAGE PROCESSING APPARATUS AND IMAGE PROCESSING METHOD FOR ESTIMATING FIXED-PATTERN NOISE ATTRIBUTABLE TO IMAGE SENSOR

(71) Applicant: CANON KABUSHIKI KAISHA, Tokyo (JP)

(72) Inventors: Tomochika Murakami, Ichikawa (JP); Kazuya Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/354,109

(22) Filed: Nov. 17, 2016

(65) Prior Publication Data
US 2017/0154409 A1 Jun. 1, 2017

(30) Foreign Application Priority Data
Dec. 1, 2015 (JP) ................................. 2015-234814

(51) Int. Cl.
G06T 5/00 (2006.01)
G06T 5/20 (2006.01)
G06T 5/50 (2006.01)
G02B 21/36 (2006.01)
G06T 11/60 (2006.01)

(52) U.S. Cl.
CPC ............ *G06T 5/002* (2013.01); *G02B 21/365* (2013.01); *G06T 5/20* (2013.01); *G06T 5/50* (2013.01); *G06T 11/60* (2013.01); *G06T 2207/10016* (2013.01); *G06T 2207/10056* (2013.01); *G06T 2207/10148* (2013.01); *G06T 2207/20021* (2013.01); *G06T 2207/20024* (2013.01);

(Continued)

(58) Field of Classification Search
None
See application file for complete search history.

(56) References Cited

U.S. PATENT DOCUMENTS 8,300,977 B2* 10/2012 Morishita ............ H04N 5/3651
348/241
8,639,056 B2* 1/2014 Zhai ......................... G06T 5/50
382/260

(Continued)

FOREIGN PATENT DOCUMENTS

JP 2007-128009 A 5/2007
JP 2013-207788 A 10/2013

OTHER PUBLICATIONS

Masanori Sat et al., U.S. Appl. No. 15/195,194, filed Jun. 28, 2016.

*Primary Examiner* — Andrae S Allison
(74) *Attorney, Agent, or Firm* — Venable LLP

(57) ABSTRACT

An image processing method includes the steps of: generating, based on data of a plurality of images acquired by performing imaging using a same image sensor, a weight coefficient corresponding to each image so that a weight coefficient corresponding to an image of which a brightness change is smooth is relatively large; integrating the data of the plurality of images using the weight coefficients to generate data of an integrated image; applying smoothing to the data of the integrated image to generate data of a smoothed integrated image; and generating, based on the data of the integrated image and the data of the smoothed integrated image, data of estimated fixed-pattern noise which is an estimated value of fixed-pattern noise attributable to the image sensor.

28 Claims, 9 Drawing Sheets

(52) U.S. Cl.
CPC .............. *G06T 2207/20182* (2013.01); *G06T 2207/20221* (2013.01)

(56) References Cited

U.S. PATENT DOCUMENTS

| | | | |
|---|---|---|---|
| 8,731,326 B2* | 5/2014 | Lee ...................... | G06K 9/4609 |
| | | | 382/195 |
| 9,148,551 B2* | 9/2015 | Hussey ................ | H04N 5/2176 |
| 9,332,190 B2* | 5/2016 | Murakami ......... | H04N 5/23296 |
| 2010/0026859 A1* | 2/2010 | Tsuruoka ............... | H04N 5/357 |
| | | | 348/241 |
| 2010/0194933 A1* | 8/2010 | Sasaki .................... | H04N 5/217 |
| | | | 348/241 |
| 2010/0259650 A1* | 10/2010 | Sasaki ................. | G06K 9/6212 |
| | | | 348/241 |
| 2012/0082399 A1* | 4/2012 | Yanada ............. | G06K 9/00973 |
| | | | 382/294 |
| 2013/0321671 A1* | 12/2013 | Cote et al. ............. | H04N 5/365 |
| | | | 348/241 |
| 2014/0098213 A1 | 4/2014 | Sato et al. | |
| 2015/0279033 A1 | 10/2015 | Murakami | |
| 2015/0310613 A1 | 10/2015 | Murakami | |

* cited by examiner

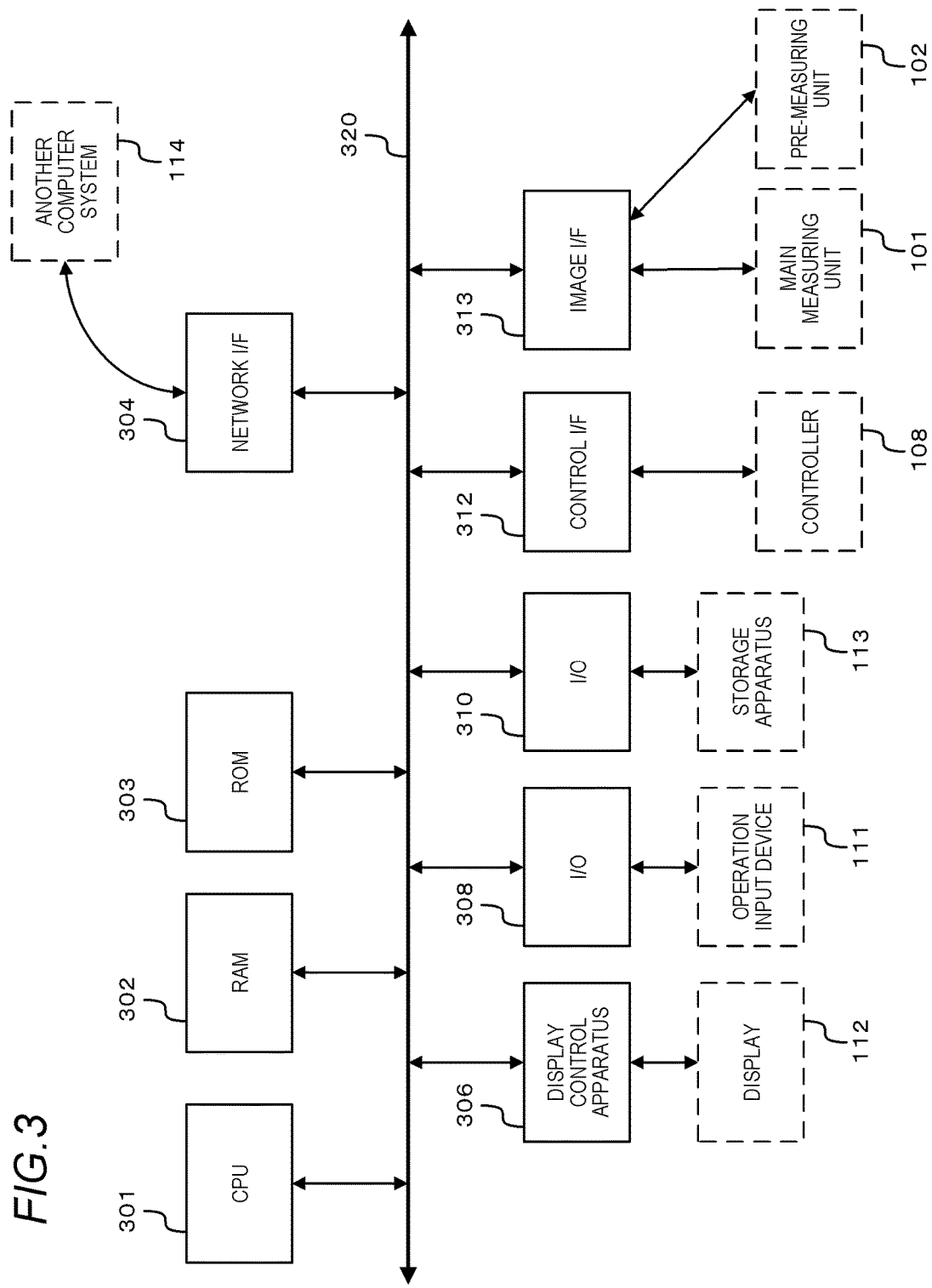

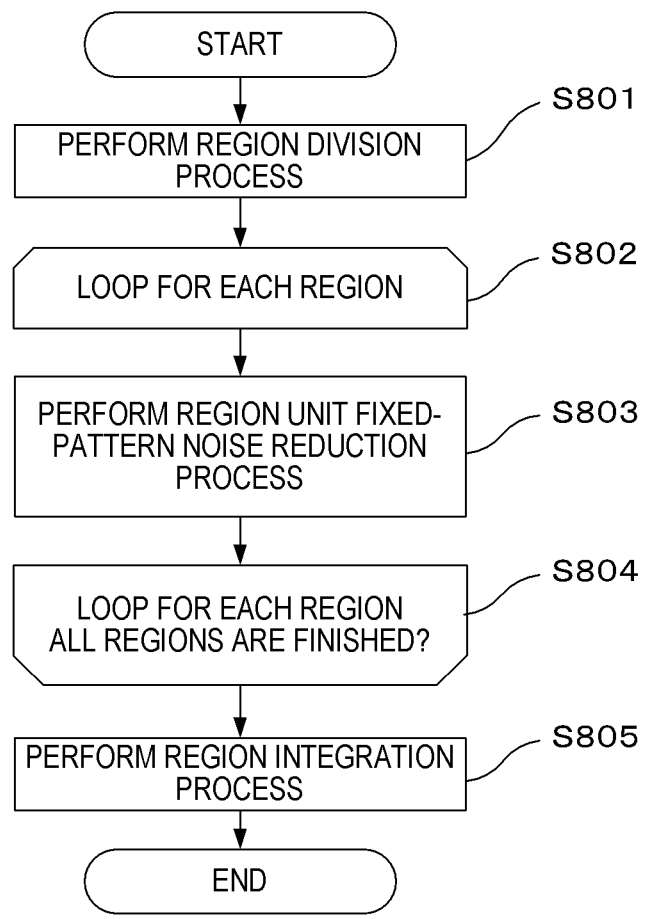

IMAGE PROCESSING APPARATUS AND IMAGE PROCESSING METHOD FOR ESTIMATING FIXED-PATTERN NOISE ATTRIBUTABLE TO IMAGE SENSOR

BACKGROUND OF THE INVENTION

Field of the Invention

The present invention relates to a technique for reducing fixed-pattern noise included in a group of images constituted by a plurality of images (for example, a plurality of images photographed by changing focusing positions, or moving image data) to enhance image quality.

Description of the Related Art

Techniques are known in which an arbitrary viewpoint image or an arbitrary out-of-focus image is generated, through restoration of a light beam space, from a group of a plurality of images that are obtained through an imaging optical system of a camera, a microscope, etc. photographing an object by changing focusing positions (such an image group is hereinafter referred to as an out-of-focus image group). For example, Japanese Patent Application Laid-open No. 2007-128009 discloses a method of generating an arbitrary viewpoint image or an arbitrary out-of-focus image by performing a coordinate transformation process of each image so that the image matches a three-dimensional convolution model and performing a three-dimensional filtering process for changing a blur on a three-dimensional frequency space. Also in documents other than Japanese Patent Application Laid-open No. 2007-128009, methods are proposed for generating an arbitrary viewpoint image or an arbitrary out-of-focus image by restoring a light beam space through a filtering process carried out on integral images of an out-of-focus image group in a viewpoint direction, using formulae that are approximately equivalent mathematically. In the present specification, image generation methods in which an arbitrary viewpoint image or an arbitrary out-of-focus image is generated from an out-of-focus image group through restoration of a light beam space will be collectively referred to as "filter type methods".

By applying such filter type methods to an out-of-focus image group having been photographed with a camera, a microscope, or the like, functions conventionally unavailable can be provided by means of post-processing after photography, without having to alter an optical system of the camera or the microscope. For example, in the case of a camera, a new way of enjoying photographs can be provided where it is possible to change a blur quality after photography. In the case of a microscope, a stereoscopic shape of an object can be intuitively discerned by changing a point of view. In addition, during high-magnification observation using a lens with a large numerical aperture, increasing a depth of field can prevent a lesion outside of a focusing position from being overlooked.

SUMMARY OF THE INVENTION

The related art described above, however, has the following problems. When filter type methods such as the representative example disclosed in Japanese Patent Application Laid-open No. 2007-128009 are applied to an out-of-focus image group, a problem may occur in that image quality of a generated image deteriorates due to fixed-pattern noise attributable to an image sensor. This problem becomes conspicuous when image magnification and reduction (changes in scale) among images constituting the out-of-focus image group is significantly small, or in other words, in the case of a group of images in which fixed-pattern noise appears in the images at approximately the same positions. Such an out-of-focus image group is obtained when photography is performed by an optical system, e.g. a double-telecentric optical system, in which relative positions and sizes of an image and an image sensor hardly change even when changing focusing positions.

As a measure to the problem described above, US2014/0098213A1 discloses a method of avoiding fixed-pattern noise by controlling the imaging apparatus. In this method, when photographing an object by changing focusing positions, fixed-pattern noise is prevented from being superimposed at a single pixel of an out-of-focus image group by performing photography while shifting relative positions of an image and an image sensor for each focusing position. However, this method cannot be applied to improve image quality when an all-in-focus image is obtained from an out-of-focus image group which has already been photographed.

While problems that occur in an out-of-focus image group have been described above, a similar problem may also occur in a group of images such as moving image data that is photographed by a same optical system. Japanese Patent Application Laid-open No. 2013-207788 discloses a method of reducing fixed-pattern noise in a moving image. However, since this method is constituted by a simplified process which involves estimating as fixed-pattern noise a difference image obtained by subtracting an average value from a relatively flat region, then estimation accuracy of the fixed-pattern noise is low. Therefore, in principle, it is difficult to realize reduction of fixed-pattern noise with high accuracy in image data including images of various objects. In addition, multiplicative fixed-pattern noise other than additive fixed-pattern noise, for example, that is attributable to a variation in sensitivity of a light receiving unit among cells of an image sensor or a variation in gain of an amplifier, cannot be reduced. Note that, in the present specification, a pixel of an image sensor will be referred to as a "cell" in order to distinguish a pixel of an image sensor from a pixel of image data.

The present invention has been made in consideration of the problems described above and an object thereof is to provide a novel technique for reducing fixed-pattern noise which is attributable to an image sensor and which is included in a plurality of images acquired by a same image sensor.

The present invention in its first aspect provides an image processing method, comprising: a weight coefficient generation step in which a computer generates, based on data of a plurality of images acquired by performing imaging using a same image sensor, a weight coefficient corresponding to each image so that a weight coefficient corresponding to an image of which a brightness change is smooth is relatively large; an integrated image generation step in which a computer integrates the data of the plurality of images using the weight coefficients to generate data of an integrated image; a smoothing step in which a computer applies smoothing to the data of the integrated image to generate data of a smoothed integrated image; and a fixed-pattern noise estimation step in which a computer generates, based on the data of the integrated image and the data of the smoothed integrated image, data of estimated fixed-pattern noise which is an estimated value of fixed-pattern noise attributable to the image sensor.

The present invention in its second aspect provides a non-transitory computer readable storage medium storing a program that causes a computer to execute respective steps of an image processing method, the image processing method comprising: a weight coefficient generation step in which a computer generates, based on data of a plurality of images acquired by performing imaging using a same image sensor, a weight coefficient corresponding to each image so that a weight coefficient corresponding to an image of which a brightness change is smooth is relatively large; an integrated image generation step in which a computer integrates the data of the plurality of images using the weight coefficients to generate data of an integrated image; a smoothing step in which a computer applies smoothing to the data of the integrated image to generate data of a smoothed integrated image; and a fixed-pattern noise estimation step in which a computer generates, based on the data of the integrated image and the data of the smoothed integrated image, data of estimated fixed-pattern noise which is an estimated value of fixed-pattern noise attributable to the image sensor.

The present invention in its third aspect provides an image processing apparatus, comprising: a weight coefficient generation unit configured to generate, based on data of a plurality of images acquired by performing imaging using a same image sensor, a weight coefficient corresponding to each image so that a weight coefficient corresponding to an image of which a brightness change is smooth is relatively large; an integrated image generation unit configured to integrate the data of the plurality of images using the weight coefficients to generate data of an integrated image; a smoothing unit configured to apply smoothing to the data of the integrated image to generate data of a smoothed integrated image; and a fixed-pattern noise estimation unit configured to generate, based on the data of the integrated image and the data of the smoothed integrated image, data of estimated fixed-pattern noise which is an estimated value of fixed-pattern noise attributable to the image sensor.

According to the present invention, fixed-pattern noise which is included in a plurality of images acquired by a same image sensor and which is attributable to the image sensor can be reduced.

Further features of the present invention will become apparent from the following description of exemplary embodiments with reference to the attached drawings.

BRIEF DESCRIPTION OF THE DRAWINGS

FIG. 3 is a diagram showing an internal configuration of an image processing apparatus (a host computer) 110;

FIG. 8 is a flowchart showing a fixed noise reduction process according to a fourth embodiment.

DESCRIPTION OF THE EMBODIMENTS

The present invention relates to a technique for reducing, by image processing (post-processing), fixed-pattern noise included in a group of images (for example, an out-of-focus image group or moving image data) constituted by a plurality of images photographed using a same optical system (imaging system). A configuration or a method according to the present invention is applicable to images obtained by various imaging apparatuses including a digital camera, a digital video camera, a digital microscope, and a virtual slide system. In particular, the present invention can be favorably applied to an out-of-focus image group photographed by a double-telecentric optical system which is significantly affected by fixed-pattern noise.

As will be described in detail later, with image processing according to the present invention, an image can be obtained in which fixed-pattern noise attributable to an image sensor of an imaging apparatus is reduced with high accuracy. In addition, by reducing fixed-pattern noise in an out-of-focus image group, image quality deterioration which poses a problem when generating an arbitrary viewpoint image or an arbitrary out-of-focus image by a filter type method from an out-of-focus image group can be suppressed. Furthermore, by combining an image processing system according to the present invention with an imaging apparatus, performance requirements that are demanded in an image sensor of the imaging apparatus can be relaxed and an improvement in a degree of design freedom and realization of low cost of an image sensor can be advantageously achieved.

First Embodiment (Overall System Configuration)

Figure 1:
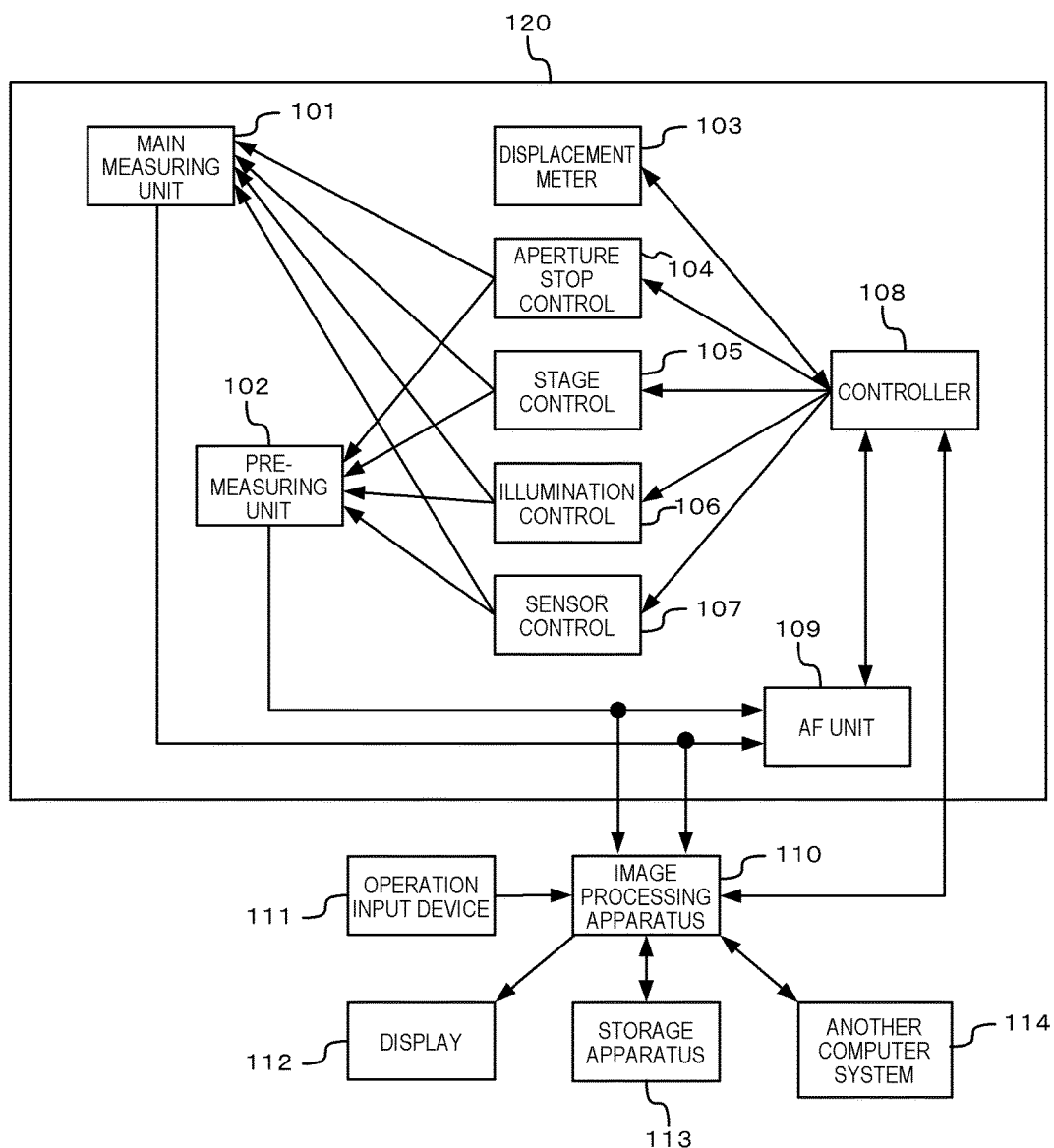
FIG. 1 is a diagram showing a configuration of a virtual slide system.

In a first embodiment, an example in which the present invention is applied to a virtual slide system configured as shown in FIG. 1 will be described.

The virtual slide system is constituted by an imaging apparatus (also referred to as virtual slide scanner) 120 which acquires imaging data of a specimen, an image processing apparatus (also referred to as host computer) 110 which performs data processing and control of the imaging data, and peripheral apparatuses of the image processing apparatus 110.

An operation input device 111 such as a keyboard and a mouse which receives an input from a user and a display 112 which displays a processed image are connected to the image processing apparatus 110. In addition, a storage apparatus 113 and another computer system 114 are connected to the image processing apparatus 110.

When imaging of a large number of specimens (slides) is performed by batch processing, the imaging apparatus 120 sequentially images the respective specimens under the control by the image processing apparatus 110 and the image processing apparatus 110 applies necessary processing to image data of each specimen. The obtained image data of each specimen is transmitted to and accumulated in the storage apparatus 113 which is a large-capacity data storage or the other computer system 114.

Imaging (pre-measurement and main measurement) by the imaging apparatus 120 is realized as the image processing apparatus 110, in response to receiving an input by a user, sends an instruction to a controller 108 and the controller 108 controls a main measuring unit 101 and a pre-measuring unit 102.

The main measuring unit 101 is an imaging unit which acquires a high-definition image to be used to diagnose a specimen in a slide. The pre-measuring unit 102 is an imaging unit which performs imaging prior to main measurement. The pre-measuring unit 102 performs image acquisition for the purpose of acquiring imaging control information which enables image acquisition to be performed with high accuracy in the main measurement.

A displacement meter 103 is connected to the controller 108 to enable measurement of the position of and the distance to a slide set on a stage in the main measuring unit 101 or the pre-measuring unit 102. The displacement meter 103 is used to measure a thickness of a specimen in the slide when performing main measurement and pre-measurement.

In addition, an aperture stop control 104 for controlling an imaging condition of the main measuring unit 101 and the pre-measuring unit 102, a stage control 105, an illumination control 106, and a sensor control 107 are connected to the controller 108. The respective controls are configured to control operations of an aperture stop, a stage, illumination, and an image sensor in accordance with to control signals from the controller 108.

The stage is a mechanism for holding, moving, and positioning a slide. The stage includes an XY stage which moves the slide in a direction perpendicular to an optical axis and a Z stage which moves the slide in a direction extending along the optical axis. The XY stage is used to move an imaging area in a specimen in directions (x and y directions) perpendicular to the optical axis and the Z stage is used to change a focusing position in a depth direction (z direction) in the specimen. Although not illustrated, the imaging apparatus 120 is provided with a rack in which a plurality of slides can be set and a conveying mechanism which feeds a slide from the rack to an imaging position on the stage. In the case of batch processing, under the control of the controller 108, the conveying mechanism sequentially feeds one slide at a time from the rack to a stage of the pre-measuring unit 102 and to a stage of the main measuring unit 101.

An AF unit 109 which realizes automatic focusing using a captured image is connected to the main measuring unit 101 and the pre-measuring unit 102. The AF unit 109 is capable of finding a focusing position by controlling positions of the stages of the main measuring unit 101 and the pre-measuring unit 102 via the controller 108. Automatic focusing adopts a passive system which uses an image. A known phase difference detection system or a known contrast detection system is used.

(Configuration of Main Measuring Unit)

Figure 2:
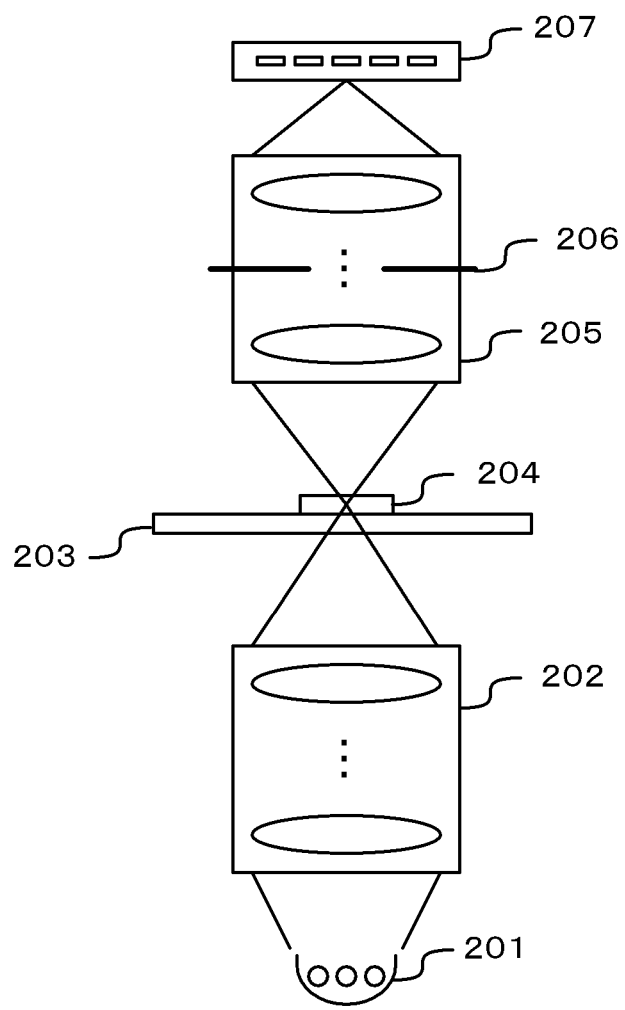
FIG. 2 is a diagram showing an internal configuration of a main measuring unit 101.

FIG. 2 is a diagram showing an internal configuration of the main measuring unit 101 according to the first embodiment.

Light from a light source 201 is uniformalized in an illumination optical system 202 to eliminate light amount irregularity and with this light a slide 204 set on a stage 203 is irradiated. The slide 204 is a specimen (an object) prepared so as to be observable by pasting a slice of tissue or a smeared cell that is an observation object on a slide glass and fixing the same under a cover glass together with a mounting agent.

An imaging optical system 205 enlarges an image of the specimen and guides the enlarged image to an imaging unit 207 that is imaging means. Light having passed through the slide 204 forms an image on an imaging surface of the imaging unit 207 via the imaging optical system 205. An aperture stop 206 is present in the imaging optical system 205, whereby a depth of field can be controlled by adjusting the aperture stop 206.

When performing imaging, the light source 201 is lit to irradiate the slide 204 with light. An image formed on the imaging surface through the illumination optical system 202, the slide 204, and the imaging optical system 205 is received by an imaging sensor of the imaging unit 207.

During monochrome (gray scale) imaging, the light source 201 emits white light for exposure and the imaging is performed once. During color imaging, exposure is sequentially performed by three light sources 201 in RGB and the imaging is performed three times to acquire a color image.

The image of the specimen formed on the imaging surface is photoelectrically converted by the imaging unit 207 and, after being subjected to A/D conversion, the image is sent to the image processing apparatus 110 as an electric signal. While it is assumed that the imaging unit 207 is constituted by a plurality of image sensors, alternatively, the imaging unit 207 may be constituted by a single sensor. In addition, the present embodiment assumes that noise reduction including a process of reducing fixed-pattern noise due to an image sensor and a development process represented by a color conversion process and a sharpening process after the execution of the A/D conversion are performed inside the image processing apparatus 110. However, the development process can be performed in a dedicated image processing unit (not illustrated) connected to the imaging unit 207 and data can be subsequently transmitted to the image processing apparatus 110. It is to be understood that such embodiments also fall within the scope of the present invention.

When an image of an entire specimen cannot be acquired by one photographing operation, a plurality of split photographing operations are performed by moving the stage 203 (the XY stage) in the x direction and/or the y direction, and an image of the entire specimen is generated by compositing (splicing together) the obtained plurality of split images. In addition, a plurality of images with different focusing positions in the optical axis direction (the depth direction) are acquired by performing a plurality of photographing operations while moving the stage 203 (the Z stage) in the z direction. In the present specification, a group of images constituted by a plurality of images obtained by imaging an object while altering the focusing position in the optical axis direction of the imaging optical system will be referred to as an "out-of-focus image group". Moreover, an out-of-focus image group may also be referred to as a "Z stack image" and each image constituting the out-of-focus image group may also be referred to as a "layer image".

(Configuration of Image Processing Apparatus)

FIG. 3 is a diagram showing an internal configuration of the image processing apparatus (the host computer) 110 according to the present embodiment.

A CPU (a processor) 301 controls the entire image processing apparatus using programs and data stored in a RAM 302 and a ROM 303. In addition, the CPU 301 performs various arithmetic processing and data processing such as a fixed-pattern noise reduction process, a development and correction process, a compositing process, a compression process, and an arbitrary viewpoint/out-of-focus image generation process.

The RAM 302 is a memory which temporarily stores programs and data loaded from the storage apparatus 113 and programs and data downloaded from the other computer system 114 via a network I/F (interface) 304. The RAM 302 also includes a work area necessary for the CPU 301 to perform various kinds of processing. The ROM 303 is a memory which stores a functional program, configuration data, and the like of a computer. A display control apparatus 306 performs control processing for causing the display 112 to display an image, characters, and the like. The display 112 displays an image for requesting the user to perform input and displays an image represented by image data acquired from the imaging apparatus 120 and processed by the CPU 301.

The operation input device 111 is constituted by a device such as a keyboard and a mouse which enables various instructions to be input to the CPU 301. The user inputs information for controlling the operation of the imaging apparatus 120 using the operation input device 111. Reference numeral 308 denotes an I/O for notifying the CPU 301 of various instructions and the like input via the operation input device 111.

The storage apparatus 113 is a large-capacity information storage apparatus such as a hard disk. The storage apparatus 113 stores an operating system (OS) and programs for causing the CPU 301 to execute the processes explained below, image data scanned by batch processing, processed image data, and the like.

Writing of information to the storage apparatus 113 and reading of information from the storage apparatus 113 are performed via an I/O 310. A control I/F 312 is an I/F for exchanging control commands (signals) with the controller 108 for controlling the imaging apparatus 120.

The controller 108 has a function of controlling the main measuring unit 101 and the pre-measuring unit 102. An interface other than those described above such as an external interface for capturing output data of a CMOS image sensor or a CCD image sensor is connected to an image interface (I/F) 313. As the interface, a serial interface such as USB or IEEE1394 or an interface such as a camera link can be used. The main measuring unit 101 and the pre-measuring unit 102 are connected via the image I/F 313.

(Arbitrary Viewpoint/Out-of-Focus Image Generation Program)

The image processing apparatus 110 is mounted with a program for causing a computer to execute an image generation process according to a filter type method which is exemplified by the method disclosed in Japanese Patent Application Laid-open No. 2007-128009 (referred to as an arbitrary viewpoint/out-of-focus image generation program). The image processing apparatus 110 is capable of generating an arbitrary viewpoint image, an arbitrary out-of-focus image, an all-in-focus image, and the like from an out-of-focus image group acquired via the imaging apparatus 120, the storage apparatus 113, and the other computer system 114.

(Explanation of Reason of Prominence of Fixed-Pattern Noise in all-in-Focus Image Generated by Filter Type Method)

Generally, an imaging system of a microscope (the main measuring unit 101 in FIG. 1) uses a double-telecentric optical system and, accordingly, magnification and reduction (changes in scale) of a specimen image among respective images constituting an out-of-focus image group is significantly small. When the filter type method according to Japanese Patent Application Laid-open No. 2007-128009 is applied to such an out-of-focus image group, a coordinate transformation process of each image in order to match the image to a three-dimensional convolution model need not be performed. Therefore, an all-in-focus image a (x,y) is obtained by deconvoluting an integral b (x,y) in the optical axis direction of the out-of-focus image group by an integral c (x,y) in the optical axis direction of a three-dimensional blur. Since deconvolution is a division in a frequency space, the all-in-focus image a (x,y) is determined by the following expression.

$$a(x,y) = \mathcal{F}^{-1}(B(u,v) \cdot C(u,v)^{-1}) \quad (1)$$

where $B(u,v)=F(b(x,y))$ and $C(u,v)=F(c(x,y))$, F denotes a Fourier transform, and $F^{-1}$ denotes an inverse Fourier transform. u and v are spatial frequencies respectively corresponding to x and y.

Expression (1) represents that $C(u,v)^{-1}$ becomes a frequency filter with respect to the integral b (x,y) in the optical axis direction of the out-of-focus image group and that an all-in-focus image is generated. As the three-dimensional blur, a Gaussian blur in which a blur radius increases in accordance with a distance from an in-focus position will be considered. In this case, while a value of the frequency filter $C(u,v)^{-1}$ is a reciprocal of the number of images in the out-of-focus image group for a DC component, the value characteristically increases as the frequency increases and approaches 1 at maximum frequency. In other words, while the frequency filter $C(u,v)^{-1}$ has an effect of suppressing low-frequency noise, the frequency filter $C(u,v)^{-1}$ does not have an effect of suppressing high-frequency noise.

Next, a case where additive Gaussian noise with a standard deviation of $\sigma=0.5$ is present as time-invariant fixed-pattern noise in each pixel of the out-of-focus image group will be considered. When the out-of-focus image group has 64 images, the fixed-pattern noise is superimposed in the integral b (x,y) in the optical axis direction of the out-of-focus image group and the standard deviation of the fixed-pattern noise is 32. Subsequently, due to the frequency filter $C^{-1}(u,v)$, amplitude of a low-frequency component of the additive Gaussian noise is restored to a minute value near 0.5 in 255 gray levels. However, amplitude of a high-frequency component remains at a large value near 32 in 255 gray levels and may be visually confirmed as large noise in an all-in-focus image.

Due to the reasons described above, when obtaining an all-in-focus image by a filter type method from an out-of-focus image group obtained with a microscope, a deterioration of quality of the all-in-focus image attributable to fixed-pattern noise becomes conspicuous. The influence of fixed-pattern noise increases as the number of images used to generate the all-in-focus image increases.

(Increasing Image Quality of Arbitrary Viewpoint/Out-of-Focus Image)

To generate an arbitrary viewpoint image or an arbitrary out-of-focus image with high image quality, as pre-processing with respect to an out-of-focus image group to be input to the arbitrary viewpoint/out-of-focus image generation program, a fixed-pattern noise reduction process to be described below is favorably performed to reduce fixed-pattern noise in the out-of-focus image group in advance. Moreover, since fixed-pattern noise may be weak as described above, desirably, a pixel value of an image of the out-of-focus image group after fixed-pattern noise reduction is not quantized to an integer value and is input to the arbitrary viewpoint/out-of-focus image generation program as real number data. In addition, since the fixed-pattern noise reduction process is realized by the image processing apparatus 110, it is assumed that the fixed-pattern noise reduction process is performed using a program mounted in a computer-executable form.

(Regarding Out-of-Focus Image Group Used in Present Embodiment)

The present embodiment assumes that an out-of-focus image group is constituted by M number of images, each image having N number of vertical pixels and N number of horizontal pixels. (Although an example in which the numbers of vertical and horizontal pixels are the same will be described in the present embodiment for the sake of simplicity, the methods according to the present embodiment are also applicable to images in which numbers of vertical and horizontal pixels do not match).

An out-of-focus image group to which fixed-pattern noise of an image sensor has been added during imaging is represented by $$y_k \in \mathbb{R}^{N \times N} \ (k=1, \ldots, M)$$

where $\mathbb{R}^{N \times N}$ denotes an N-row, N-column matrix composed of real number elements. A subscript k denotes a number of an image constituting the out-of-focus image group and corresponds to a focusing position. An image $y_k$ that constitutes the out-of-focus image group may be an output signal itself (including a signal representing values of a plurality of cells which have been added by a binning process). Alternatively, the image $y_k$ may be an image obtained by subjecting an output signal of the image sensor to a development process such as gradation transformation and interpolation in which correspondence with a cell of the image sensor is maintained. Hereinafter, a value of a pixel of an image will be referred to as brightness.

An out-of-focus image group obtained by changing brightness in order to reduce fixed-pattern noise of an out-of-focus image group $y_k$ (k=1, ..., M) is represented by $$x_k \in \mathbb{R}^{N \times N} \ (k=1, \ldots, M)$$

In addition, an out-of-focus image group including only deterioration due to an optical blur of the imaging system is represented by $$o_k \in \mathbb{R}^{N \times N} \ (k=1, \ldots, M)$$

Brightness of pixels at a j-th vertical and an i-th horizontal position of k-th images $y_k$ and $x_k$ constituting the out-of-focus image group is respectively represented by $(y_k)_{i,j}$ and $(x_k)_{i,j}$.

The present embodiment assumes that additive fixed-pattern noise $n \in \mathbb{R}^{N \times N}$ that is independent of an image component or a temporal change of an image of an object has been added to an out-of-focus image group $y_1, \ldots, y_M$. In other words, an out-of-focus image group $y_k$ can be expressed by the following expression.

$$y_k = o_k + n \ (k=1, \ldots, M) \quad (2)$$

While a value $(n)_{i,j}$ of fixed-pattern noise n at each pixel (i,j) is attributable to various manufacturing errors of an image sensor, the present embodiment treats $(n)_{i,j}$ on the assumption that an occurrence frequency distribution of $(n)_{i,j}$ conforms to a normal distribution with an average of 0 and a standard deviation of σ. However, even if the occurrence frequency distribution of a value of each element of the fixed-pattern noise n does not conform to a normal distribution, fixed-pattern noise can be reduced with the method according to the present embodiment.

(Concept of Fixed-Pattern Noise Reduction)

Figure 4A:
FIGS. 4A to 4D are schematic diagrams for explaining a concept of fixed-pattern noise reduction.
Figure 4B:
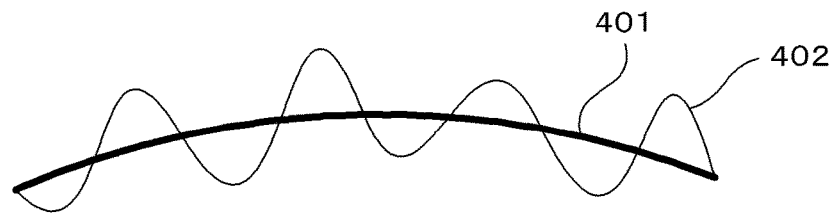

A concept of fixed-pattern noise reduction according to the present embodiment will now be explained with reference to FIGS. 4A to 4D. FIGS. 4A to 4D are schematic diagrams representing a brightness change in accordance with pixel positions in a single given image in an out-of-focus image group, in which a horizontal direction represents a pixel position and a vertical direction represents brightness in the image. Reference numeral 401 in FIG. 4A represents a brightness change of an ideal image that does not include any noise components (in other words, an image component derived from an image of an object). Reference numeral 402 in FIG. 4B represents a brightness change when fixed-pattern noise is added to the brightness change 401 of an ideal image.

Figure 4C:
Figure 4D:
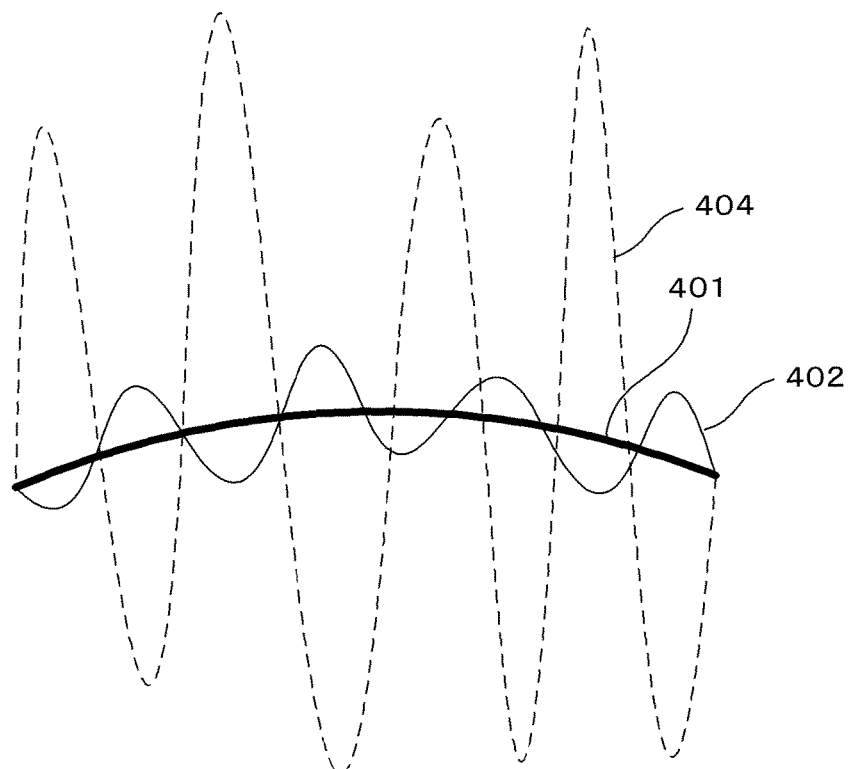

When the brightness change of an image is smooth, by applying appropriate smoothing to the image (402) including fixed-pattern noise, a brightness change of an image component derived from an image of the object can be accurately estimated (restored) as indicated by reference numeral 403 in FIG. 4C. Therefore, it is conjectured that, by obtaining a difference in brightness between the image (402) including fixed-pattern noise and the smoothed image (403), a fixed-pattern noise component attributable to an image sensor can be detected relatively easily. However, in reality, a single image contains random noise and quantization noise. Reference numeral 404 in FIG. 4D represents a brightness change after random noise and quantization noise are further added to the brightness change 402 containing fixed-pattern noise. As is apparent from FIG. 4D, when intensity of random noise or quantization noise is high, it is difficult to accurately estimate fixed-pattern noise from a single image.

Random noise and quantization noise can be suppressed by using an average image obtained by averaging brightness of a plurality of images constituting an out-of-focus image group. However, since average brightness is affected by an image with high sharpness, a brightness change of the average image becomes less smooth. Therefore, even if the smoothing described earlier is applied to the average image, a brightness change of an image component derived from an image of an object cannot be accurately restored and estimation accuracy of fixed-pattern noise declines.

From the above, it is clear that an image which only contains a small amount of random noise or quantization noise and of which a brightness change is smooth is desirably used to accurately estimate fixed-pattern noise. In consideration thereof, in the present embodiment, in order to obtain an image in which suppression of random noise and smoothness of a brightness change are well-balanced, a weight such that the higher the sharpness of an image, the smaller the value of the weight is obtained, and an integrated image is generated by performing weighted averaging using the weight. In such an integrated image, random noise and quantization noise are suppressed and a smoother brightness change is attained. In addition, since intensity of fixed-pattern noise does not decline due to weighted averaging, the integrated image is expected to assume a brightness change such as that represented by reference numeral 402 in FIG. 4B. Therefore, fixed-pattern noise can be accurately estimated by using the integrated image described above.

(Fixed-Pattern Noise Reduction Process)

Figure 5:
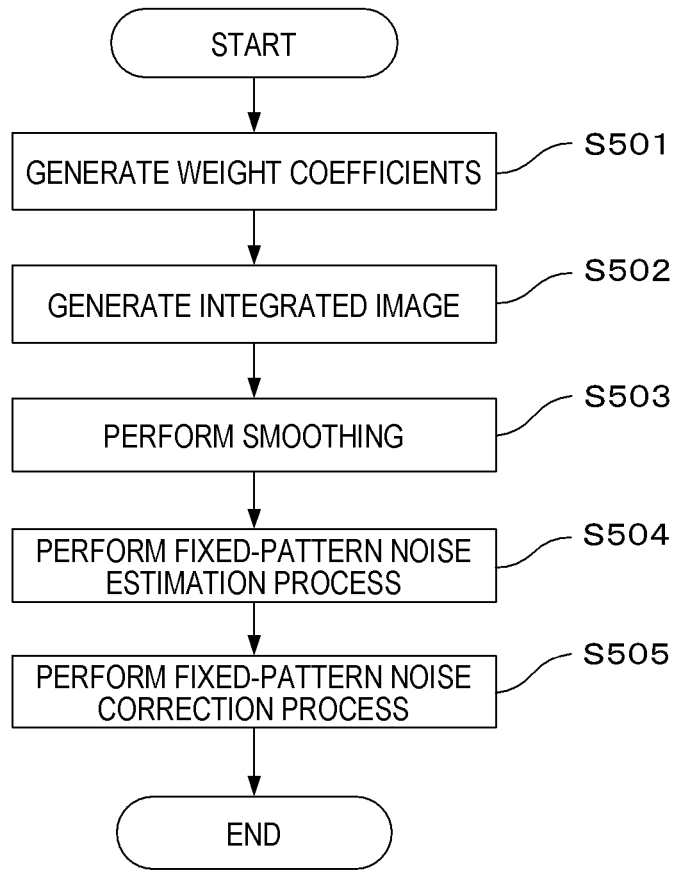
FIG. 5 is a flowchart showing a fixed noise reduction process according to a first embodiment.

FIG. 5 is a flow chart showing a fixed-pattern noise reduction process according to the present embodiment. First, in a weight coefficient generation step S501, the image processing apparatus 110 determines a weight coefficient sequence corresponding to each of a plurality of images constituting an out-of-focus image group. Details will be provided later. Next, in an integrated image generation step S502, the image processing apparatus 110 subjects the plurality of images constituting the out-of-focus image group to weighted averaging using the weight coefficient sequence and generates an integrated image. Details will be provided later. Subsequently, in a smoothing step S503, the image processing apparatus 110 applies smoothing to the integrated image and generates a smoothed integrated image. Details will be provided later. Next, in a fixed-pattern noise estimation process step S504, using the integrated image generated in step S502 and the smoothed integrated image generated in step S503, the image processing apparatus 110 generates estimated fixed-pattern noise which is an estimated value of fixed-pattern noise attributable to an image sensor. Details will be provided later. Finally, in a fixed-pattern noise correction process step S505, using the estimated fixed-pattern noise determined in step S504, the image processing apparatus 110 reduces fixed-pattern noise included in each of the plurality of images constituting the out-of-focus image group. Details will be provided later. Hereinafter, details of each process in the present embodiment will be described.

(Weight Coefficient Generation Process)

In the weight coefficient generation step S501, the image processing apparatus 110 determines a weight coefficient corresponding to each image that constitutes an out-of-focus image group and generates a weight coefficient sequence $w \in R^M$. At this point, a weight coefficient corresponding to each image is set such that a weight coefficient corresponding to an image of which a brightness change is smooth is relatively large and a weight coefficient corresponding to an image of which a brightness change is not smooth is relatively small. In the present embodiment, smoothness of a brightness change is assessed by a metric of sharpness of an image. In other words, the sharpness of each image is calculated, and the weight coefficient corresponding to each image is set such that a negative correlation is established with the sharpness.

Specifically, as an example of a method of generating a weight coefficient sequence corresponding to images $y_k \in R^{N \times N}$ ($k=1, \ldots, M$) constituting the out-of-focus image group, the following function is used.

$$(w)_k = \frac{\alpha}{std(y_k)^\beta} \quad (k = 1, \ldots, M) \tag{3}$$

Here, $\alpha$ denotes a constant for adjusting a sum of weight coefficients $(w)_1$ to $(w)_M$ to 1, and std $(y_k)$ denotes a function for determining a standard deviation as sharpness of an input image $y_k$ and is represented by Expression (4). $\beta$ ($>0$) denotes a parameter for adjusting a relationship between the sharpness of an image and a weight coefficient.

$$std(y_k) = \sqrt{\frac{1}{N^2} \sum_{j=1}^{N} \sum_{i=1}^{N} ((y_k)_{i,j} - mean(y_k))^2} \quad (k = 1, \ldots, M) \tag{4}$$

where $$mean(y_k) = \frac{1}{N^2} \sum_{j=1}^{N} \sum_{i=1}^{N} (y_k)_{i,j} \quad (k = 1, \ldots, M) \tag{5}$$

In addition, an in-focus image in which an object is in focus may be intentionally excluded. For example, assuming that an image of which sharpness is equal to or higher than a threshold is an in-focus image, the weight coefficient corresponding to an image $y_k$ of which std $(y_k)$ is equal to or higher than a threshold $s_{th}$ may be set to $(w)_k=0$. When an adjustment for changing the weight coefficient of an in-focus image to 0 is performed after calculating the weight coefficient sequence using Expression (3), $\alpha$ may be recalculated so that the sum of weight coefficients after the adjustment equals 1.

The function expressed by Expression (3) is merely an example and various modifications can be made. Metrics for assessing a degree of sharpness of an image other than the function std $(y_k)$ such as a sum of absolute values of differentials of brightness (total variation) or entropy may be used.

In addition, generally, since the greater the separation of a focusing position from an in-focus position (a position at which an object is in focus), the greater the blur of an image and the greater the smoothness of a brightness change, a weight coefficient of each image can be set in accordance with a distance in an optical axis direction from the in-focus position. In other words, a weight coefficient corresponding to each image is set so that the weight coefficient has a positive correlation with the distance between the focusing position of the image and the in-focus position (for example, the greater the separation of the focusing position from the in-focus position, the larger the weight coefficient). Even in this case, an image of which a distance from the in-focus position is equal to or shorter than a threshold may be assumed to be an in-focus image and a weight coefficient of the in-focus image may be set to 0.

Moreover, various methods can be used to identify an in-focus position. For example, a focusing position where the sharpness described above is the highest may be assumed to be an in-focus position. Alternatively, information on automatic focusing during imaging may be acquired and information on an in-focus position or an optical axis direction of an object may be acquired from the acquired information. In addition, when a depth map can be acquired, an in-focus position or a position in an optical axis direction of an object may be acquired from the depth map (a specific example of generating a weight coefficient sequence from a depth map will be described in detail in a fourth embodiment).

(Integrated Image Generation Process)

In the integrated image generation step S502, using the weight coefficient sequence w calculated in step S501, the image processing apparatus 110 generates an integrated image $c \in R^{N \times N}$ from the out-of-focus image group $y_k \in R^{N \times N}$. As an example, a weighted average such as that presented below may be used in the integration process.

$$(c)_{i,j} = \sum_{k=1}^{M} (w)_k \cdot (y_k)_{i,j} \quad (i, j = 1, \ldots, N) \tag{6}$$

As described above, since the weight coefficient $(w_k)$ is large with respect to an image with low sharpness (a blurred image) and small with respect to an image with high sharpness (an in-focus image), the integrated image c obtained by weighted averaging is an image of which a brightness change is smoother than an average image obtained by simple averaging. In addition, random noise and quantization noise individually included in each image can be reduced while maintaining intensity of fixed-pattern noise commonly included in each image.

(Smoothing)

In the smoothing step S503, the image processing apparatus 110 applies smoothing to the integrated image c and generates a smoothed integrated image $c' \in R^{N \times N}$. As the smoothing, a filtering process using a smoothing filter, a noise reduction process based on iterative calculations, or the like can be used. In the present embodiment, total variation minimization which is a representative algorithm of a noise reduction process based on iterative calculations is used for smoothing.

Total variation minimization is, for example, a convex optimization problem which is represented by Expression (7) below and which improves smoothness of an image.

$$x^{(*)} = \underset{x}{\arg\min} J(x) \text{ s.t. } \|x - y\|_2 \leq \varepsilon \tag{7}$$

$$J(x) = \sum_{j=1}^{N}\sum_{i=1}^{N}|(\nabla x)_{i,j}| \qquad (8)$$

Expression (7) represents an optimization problem of determining, with respect to an input image y, an optimal solution $x^{(*)}$ that minimizes an objective function J(x) when x is varied within a range of a constraint expressed as $$\|x-y\|_2 \le \varepsilon$$

"s.t." is an abbreviation of "subject to" and represents a constraint to be satisfied by the solution x. The constraint of Expression (7) is a condition that a distance (an L2 norm) between the solution x (in other words, an image after a brightness change) and the input image y does not exceed a prescribed value ε. $(\nabla x)i,j$ in Expression (8) denotes a gradient (a derivative or a difference) of brightness at a coordinate (i, j) of an image x. The objective function J(x) is a value obtained by integrating an absolute value of the gradient of brightness by the entire image and the greater the overall smoothness of a brightness change in the image, the smaller the value.

An approximate solution of an optimization problem formulated as expressed by Expression (7) can be calculated using an iterative calculation formula obtained by applying an optimization algorithm of a successive approximation method.

Besides total variation minimization, smoothing may also be performed using TGV minimization. Total generalized variation (TGV) is a metric of a smoothness of an image which not only considers a first derivative (or a difference) of an image but also considers higher-order derivatives (or a plurality of differences with respect to the difference). Therefore, when TGV is used as a metric of an objective function, there is an advantage that step-like artifacts which occur in a gradation region of an image can be suppressed as compared to using TV which only considers a first derivative (difference).

ε used in the constraint represented by Expression (7) can be given by $$\varepsilon = N\sigma \qquad (9)$$

using a standard deviation σ of fixed-pattern noise $n \in R^{N \times N}$ determined in advance. Moreover, Nσ denotes an expectation value of an L2 norm of a vector obtained by one-dimensionally arranging respective elements of the fixed-pattern noise $n \in R^{N \times N}$. Fixed-pattern noise can be appropriately reduced by applying an appropriate ε. While a value of each element of the fixed-pattern noise n is dependent on an individual difference of an image sensor, the standard deviation σ is information with low individual dependence and high commonality. Therefore, σ of fixed-pattern noise need not necessarily be determined in advance. For example, information stored in the other computer system 114 having disclosed specifications of an image sensor can be acquired via the network interface (I/F) 304.

Moreover, in the smoothing step S503, a filtering process using a known smoothing filter may be used as the smoothing. As the smoothing filter, for example, an epsilon filter, a median filter, an averaging filter, a Gaussian filter, a Savitzky-Golay filter, or a bilateral filter can be used.

The smoothed integrated image c' generated by smoothing can be assumed to be an integrated image of an out-of-focus image group $o_k \in R^{N \times N}$ (k=1, ..., M) which only includes deterioration due to optical blur of an imaging optical system.

(Fixed-Pattern Noise Estimation Process)

In the fixed-pattern noise estimation process step S504, the image processing apparatus 110 generates estimated fixed-pattern noise $n' \in R^{N \times N}$ by determining a difference between the integrated image c and the smoothed integrated image c' using Expression (10) below.

$$n'=c-c' \qquad (10)$$

(Fixed-Pattern Noise Correction Process)

Next, in the fixed-pattern noise correction process step S505, the image processing apparatus 110 determines an out-of-focus image group $x_k$ (k=1, ..., M) in which fixed-pattern noise has been reduced by subtracting the estimated fixed-pattern noise n' from the out-of-focus image group $y_k$ (k=1, ..., M) using Expression (11) below.

$$x_k = y_k - n' \; (k=1, \ldots, M) \qquad (11)$$

Using the fixed-pattern noise reduction method according to the present embodiment described above enables additive fixed-pattern noise which is attributable to an image sensor and which is included in an out-of-focus image group to be reduced with high accuracy. By using an out-of-focus image group in which fixed-pattern noise is reduced in this manner, image quality deterioration which poses a problem when generating an arbitrary viewpoint image or an arbitrary out-of-focus image by a filter type method from an out-of-focus image group can be suppressed.

Second Embodiment

The first embodiment describes a method of reducing fixed-pattern noise in a case where additive fixed-pattern noise that is independent of an image component of an image of an object has been added to an out-of-focus image group. However, fixed-pattern noise also includes fixed-pattern noise dependent on a variation in sensitivity among cells of an image sensor or a variation in gain of an amplifier. Such fixed-pattern noise has intensity that is dependent on an amount of charge accumulated in a cell of the image sensor or, in other words, dependent on an image component of an image of an object, and is referred to as multiplicative fixed-pattern noise.

An out-of-focus image group $y_k$ (k=1, ..., M) to which multiplicative fixed-pattern noise has been added can be expressed by the following expressions.

$$y_k = o_k + n_k \; (k=1, \ldots, M) \qquad (12)$$

$$(n_k)_{i,j} = (v)_{i,j}(o_k)_{i,j}, \; i,j \in \{1, \ldots, N\}, \; k \in \{1, \ldots, M\} \qquad (13)$$

By arranging Expressions (12) and (13), the out-of-focus image group $y_k$ (k=1, ..., M) can also be expressed by the following expression.

$$(y_k)_{i,j} = (o_k)_{i,j} \cdot \{1+(v)_{i,j}\}, \; i,j \in \{1, \ldots, N\}, \; k \in \{1, \ldots, M\} \qquad (14)$$

$n_k$ (k=1, ..., M) in Expression (12) represents multiplicative fixed-pattern noise. Even when imaging is performed by a same cell of an image sensor, multiplicative fixed-pattern noise changes when an image of the object changes depending on focusing positions.

$v \in R^{N \times N}$ in Expression (13) denotes data representing a gain error (an error when a reference value of the gain is 1) of an image sensor, and $(v)_{i,j}$ denotes a gain error of a cell of an image sensor corresponding to a pixel (i, j). In addition, $\{1+(v)_{i,j}\}$ in Expression (14) denotes a gain of a cell of the image sensor corresponding to the pixel (i, j), where gain=1 in a case of a gain error of 0, gain >1 in a case of a positive gain error, and gain <1 in a case of a negative gain error.

Moreover, when data of a single pixel (i, j) is obtained from charges of a plurality of cells of the image sensor, an average of gain errors of the plurality of cells may be set as $(v)_{i,j}$. The gain error v is generated due to various manufacturing errors of an image sensor. While the present embodiment treats $(v)_{i,j}$ on the assumption that an occurrence frequency distribution thereof conforms to a normal distribution with an average of 0 and a standard deviation of $\sigma_v$, even if $(v)_{i,j}$ does not conform to a normal distribution, fixed-pattern noise can be reduced with the method according to the present embodiment.

The fixed-pattern noise reduction process according to the present embodiment will now be described using FIG. 5, with a focus on differences from the first embodiment.

Processes of the weight coefficient generation step S501 and the integrated image generation step S502 are similar to those of the first embodiment and a description thereof will be omitted. Hereinafter, the smoothing step S503 according to the present embodiment will be described.

(Smoothing)

Multiplicative fixed-pattern noise is represented by Expression (13). Therefore, $$\varepsilon = N\sigma_v y^{(ave)} \quad (15)$$

is used as ε of the constraint of the optimization problem represented by Expression (7). $y^{(ave)}$ denotes an average value of all pixels of the out-of-focus image group $y_1, \ldots, y_M$ and is expressed by the following expression.

$$y^{(ave)} = \frac{1}{N^2 M} \sum_{k=1}^{M} \sum_{j=1}^{N} \sum_{i=1}^{N} (y_k)_{i,j} \quad (16)$$

Expression (15) is an example of an approximate value of an expectation value of an L2 norm of a vector obtained by one-dimensionally arranging respective elements of multiplicative fixed-pattern noise $n_k$.

Moreover, the standard deviation $\sigma_v$ of a gain error may be determined by measurements performed in advance or information stored in the other computer system 114 may be acquired via the network interface (I/F) 304 in a similar manner to the first embodiment.

(Fixed-Pattern Noise Estimation Process)

The fixed-pattern noise estimation process step S504 according to the present embodiment will now be described. (In the present embodiment, while only a process of estimating the gain error v may sometimes be performed in the fixed-pattern noise estimation process step S504 in a departure from the first embodiment, the name of S504 will remain the "fixed-pattern noise estimation process step" in a similar manner to the first embodiment). In the fixed-pattern noise estimation process step S504 according to the present embodiment, the image processing apparatus 110 generates estimated fixed-pattern noise $n' \in R^{N \times N}$ of an integrated image by determining a difference between the integrated image c and the smoothed integrated image c' by Expression (17) below.

$$n' = c - c' \quad (17)$$

In the expression above, assuming that the smoothed integrated image c' does not include fixed-pattern noise, the smoothed integrated image c' is equal to an integrated image $m \in R^{N \times N}$ of the out-of-focus image group $o_k \in R^{N \times N}$ (k=1, ..., M). In other words, $$(c')_{i,j} = \sum_{k=1}^{M} (w)_k \cdot (o_k)_{i,j} = (m)_{i,j}$$

is satisfied.

In addition, using the integrated image m, the integrated image c is expressed as $$(c)_{i,j} = (m)_{i,j}\{1 + (v)_{i,j}\}$$

Therefore, Expression (17) can be modified to Expression (18) below.

$$(n')_{i,j} \cong (m)_{i,j}\{1+(v)_{i,j}\} - (m)_{i,j} = (v)_{i,j} \cdot (m)_{i,j} \cong (v)_{i,j} \cdot (c')_{i,j} \quad (18)$$

In other words, estimated data v' of a gain error can be determined by Expression (19) below using the smoothed integrated image c' and the estimated fixed-pattern noise n' of the integrated image which are known information.

$$(v')_{i,j} = \frac{(n')_{i,j}}{(c')_{i,j}} \quad (19)$$

(Fixed-Pattern Noise Correction Process)

The fixed-pattern noise correction process step S505 according to the present embodiment will now be described.

In the present embodiment, the image processing apparatus 110 determines an out-of-focus image group $x_k$ (k=1, ..., M) in which fixed-pattern noise has been reduced by Expression (20) below using the estimated data v' of a gain error determined in the fixed-pattern noise estimation process step S504.

$$(x_k)_{i,j} = \frac{(y_k)_{i,j}}{\{1 + (v')_{i,j}\}} \quad (20)$$

Expression (20) signifies dividing brightness $(y_k)_{i,j}$ of a pixel (i, j) of an image $y_k$ by an estimated gain $\{1+(v')_{i,j}\}$ of the pixel (i, j) (or multiplying the brightness $(y_k)_{i,j}$ by an inverse of the estimated gain $\{1+(v')_{i,j}\}$). In other words, images $x_1, \ldots, x_M$ in which multiplicative fixed-pattern noise has been reduced can be generated by dividing each of images $y_1, \ldots, y_M$ constituting the out-of-focus image group by an estimated gain (or by multiplying by an inverse of the estimated gain). Moreover, Expression (20) is equivalent to an expression for determining the out-of-focus image group $o_k$ (k=1, ..., M) which does not include fixed-pattern noise from Expression (14).

Moreover, when $(c')_{i,j}=0$ in Expression (19), $(v')_{i,j}$ with respect to a position (i, j) is not calculated in the fixed-pattern noise estimation process. In this case, $(x_k)_{i,j}=0$ is set in the subsequent fixed-pattern noise correction process.

Alternatively, a configuration may be adopted in which, in the fixed-pattern noise estimation process step S504, the estimated fixed-pattern noise $n'_k \in R^{N \times N}$ (k=1, ..., M) is determined by Expression (21) below using the determined estimated data v' of a gain error.

$$(n'_k)_{i,j} = (v')_{i,j} \cdot (y_k)_{i,j} \quad (21)$$

Expression (21) is an expression for determining estimated fixed-pattern noise under the assumption that fixed-pattern noise $n_k$ (k=1, ..., M) is minute in Expression (13) and that $o_k \cong y_k$.

When determining the estimated fixed-pattern noise $n'_k$ as described above, a configuration is adopted in which, in the fixed-pattern noise correction process step S505, an out-of-focus image group $x_k$ (k=1, . . . , M) in which fixed-pattern noise has been reduced is determined using Expression (22) below.

$$x_k = y_k - n'_k \ (k=1, \ldots, M) \tag{22}$$

As described above, by using the method according to the present embodiment, multiplicative fixed-pattern noise which is attributable to an image sensor and which is included in an out-of-focus image group can be reduced with high accuracy. By using an out-of-focus image group in which fixed-pattern noise is reduced in this manner, image quality deterioration which poses a problem when generating an arbitrary viewpoint image or an arbitrary out-of-focus image by a filter type method from an out-of-focus image group can be suppressed.

Third Embodiment

When fixed-pattern noise is multiplicative noise, multiplicative noise can be treated as additive noise by applying an appropriate transformation to an image, and fixed-pattern noise can be reduced using the fixed-pattern noise reduction process described in the first embodiment. Hereinafter, a method of reducing multiplicative fixed-pattern noise will be described.

By taking the logarithm of both sides of Expression (14), the following expression is derived.

$$\log((y_k)_{i,j}) = \log((o_k)_{i,j}) + \log(\{1+(v)_{i,j}\}), \ i,j \in \{1, \ldots, N\}, k \in \{1, \ldots, M\} \tag{23}$$

In other words, by taking the logarithm of brightness of each image of an out-of-focus image group, multiplicative fixed-pattern noise can be converted to additive fixed-pattern noise which is not dependent on a focusing position (k).

Figure 6:
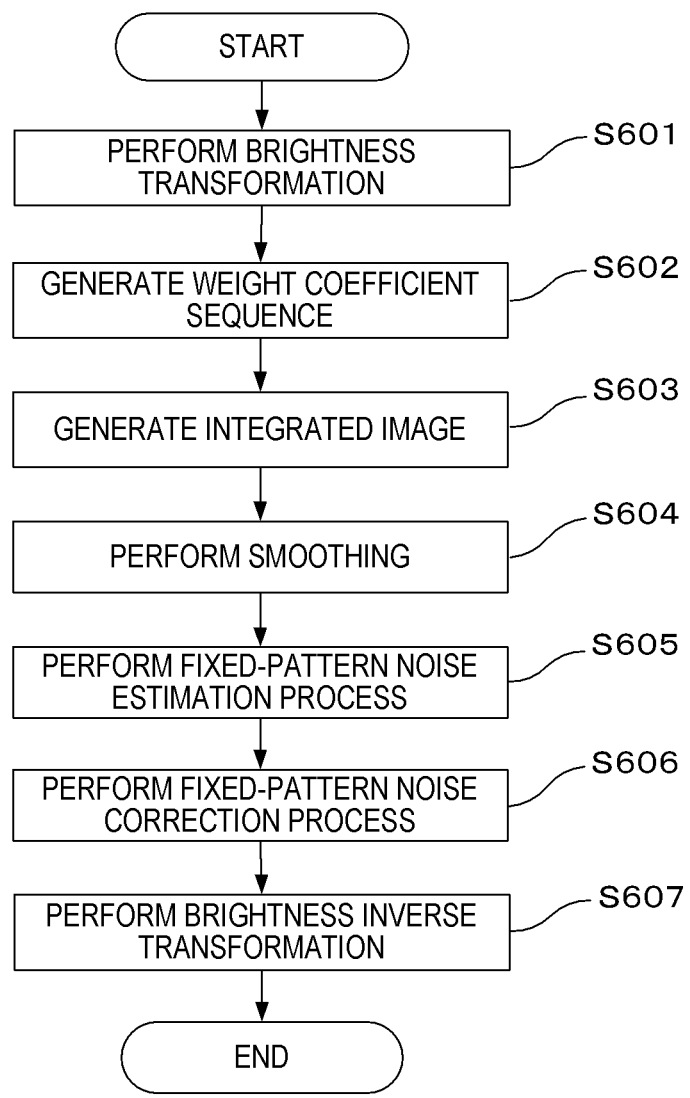
FIG. 6 is a flowchart showing a fixed noise reduction process according to a third embodiment.

FIG. 6 is a flow chart showing a fixed-pattern noise reduction process according to the present embodiment. Processing according to the present embodiment will now be described with reference to FIG. 6.

First, in a brightness transformation step S601, the image processing apparatus 110 performs a logarithmic transformation on brightness of each pixel of the out-of-focus image group $y_1, \ldots, y_M$ at the time of photography to which multiplicative fixed-pattern noise has been added to generate a brightness-transformed out-of-focus image group $b_k \in R^{N \times N}$ (k=1, . . . , M).

$$(b_k)_{i,j} = \log((y_k)_{i,j}), \ i,j \in \{1, \ldots, N\}, k \in \{1, \ldots, M\} \tag{24}$$

Next, in a weight coefficient generation step S602, a similar process to step S501 in the first embodiment is performed. Specifically, using Expression (3), the image processing apparatus 110 calculates a weight coefficient $(w)_k$ corresponding to each image from an out-of-focus image group $y_k$ (k=1, . . . , M) and generates a weight coefficient sequence $w \in R^M$. Moreover, the weight coefficient sequence w may be calculated using brightness-transformed images $b_1, \ldots, b_M$ instead of the out-of-focus image group $y_1, \ldots, y_M$ at the time of photography. In this case, a function suitable for brightness-transformed images is to be used as the function for determining a weight coefficient sequence.

Next, in an integrated image generation step S603, using the weight coefficient sequence w generated in step S602, the image processing apparatus 110 generates an integrated image $c \in R^{N \times N}$ by Expression (25) below.

$$(c)_{i,j} = \sum_{k=1}^{M} (w)_k \cdot (b_k)_{i,j}, \ i, j \in \{1, \ldots, N\} \tag{25}$$

Subsequently, in a smoothing step S604, the image processing apparatus 110 applies smoothing to the integrated image c and generates a smoothed integrated image c' in a similar manner to step S503 in the first embodiment. However, parameters suitable for images after a brightness change are to be used as parameters of the smoothing. For example, when performing total variation minimization or TGV minimization, using a value of a standard deviation $\sigma_v$ of a gain error v, $$\varepsilon = N\sigma_v \tag{26}$$

is set as $\varepsilon$ corresponding to an L2 norm of fixed-pattern noise. This is because when x is close to 0, log (1+x) can be approximated to x.

Next, in a fixed-pattern noise estimation process step S605, the image processing apparatus 110 estimates fixed-pattern noise included in the brightness-transformed out-of-focus image group $b_1, \ldots, b_M$ and generates estimated fixed-pattern noise. Estimated fixed-pattern noise is determined using Expression (10) in a similar manner to the first embodiment.

Subsequently, in a fixed-pattern noise correction process step S606, the image processing apparatus 110 generates a brightness-transformed out-of-focus image group $a_k \in R^{N \times N}$ (k=1, . . . , M) in which fixed-pattern noise has been reduced from the brightness-transformed out-of-focus image group $b_k$ (k=1, . . . , M) which includes fixed-pattern noise. The fixed-pattern noise correction process is realized using Expression (11) in a similar manner to the first embodiment.

Next, in a brightness inverse transformation step S607, the image processing apparatus 110 applies an exponential function that is an inverse function of the logarithmic function to each pixel of the brightness-transformed out-of-focus image group $a_1, \ldots, a_M$ in which fixed-pattern noise has been reduced. Due to the inverse transformation, an out-of-focus image group $x_1, \ldots, x_M$ in which fixed-pattern noise has been reduced is determined. In other words, the following calculation is performed.

$$(x_k)_{i,j} = \exp((a_k)_{i,j}), \ i,j \in \{1, \ldots, N\}, k \in \{1, \ldots, M\} \tag{27}$$

Due to the fixed-pattern noise reduction process described above, multiplicative fixed-pattern noise included in the out-of-focus image group $y_k$ (k=1, . . . , M) can be appropriately reduced. Moreover, even when fixed-pattern noise other than additive and multiplicative noises is present, such fixed-pattern noise can be reduced by using the method according to the present embodiment. For example, in the case of Poisson noise in which variance $\sigma^2$ of fixed-pattern noise is average brightness, Anscombe transform which is a type of variance-stabilizing transformation is applied. As a result, Poisson noise can be treated as additive noise. In the brightness transformation step S601, the image processing apparatus 110 applies the following transformation to the brightness of each pixel of the out-of-focus image group $y_k$ (k=1, . . . , M) and determines a brightness-transformed out-of-focus image group $b_k$ (k=1, . . . , M).

$$\phi_1(x) = 2\sqrt{x + \frac{3}{8}} \tag{28}$$

In addition, in the brightness inverse transformation step S607, the image processing apparatus 110 applies the following inverse transformation to the brightness of each pixel of the brightness-transformed out-of-focus image group $a_k$ (k=1, . . . , M) and determines an out-of-focus image group $x_k$ (k=1, . . . , M) in which fixed-pattern noise has been reduced.

$$\phi_2(x) = \left(\frac{x}{2}\right)^2 - \left(\frac{1}{8}\right) \quad (29)$$

However, in the smoothing step S604, ε=N is set as ε of the constraint of the optimization problem represented by Expression (7). This is because, in Anscombe transform, the standard deviation of Poisson noise after the brightness transformation is 1.

Fourth Embodiment

The fixed-pattern noise reduction processes presented in the first to third embodiments were described mainly assuming a case where an object photographed as an out-of-focus image group is present at one focusing position.

In the present embodiment, a method of realizing a fixed-pattern noise reduction process suitable when a plurality of objects with different focusing positions are present in an out-of-focus image group $y_1, \ldots, y_M$ will be described.

Figure 7:
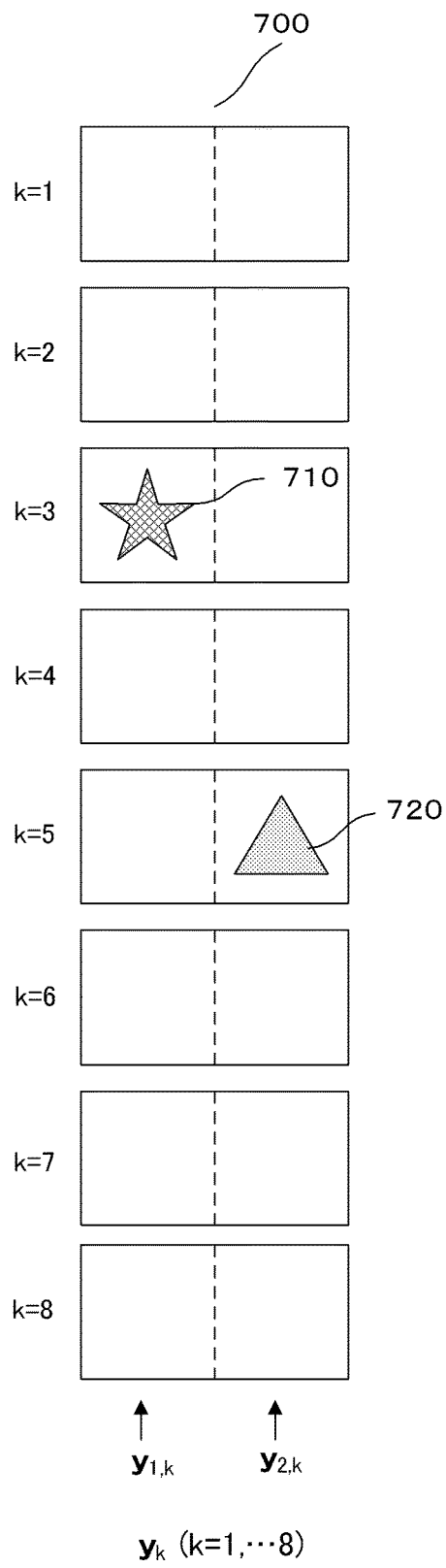
FIG. 7 is a schematic diagram of an out-of-focus image group in which a plurality of objects with different focusing positions are present.

FIG. 7 is a schematic diagram showing each image of an out-of-focus image group obtained by imaging a plurality of objects with different focusing positions. FIG. 7 shows how, in an out-of-focus image group constituted by eight images, images 710 (star) and 720 (triangle) of objects come into focus at respectively different focusing positions k=3 and k=5. Although not shown in FIG. 7, out-of-focus images of the objects exist before and after the respective in-focus positions.

In order to reduce fixed-pattern noise in an out-of-focus image group such as that shown in FIG. 7, when sharpness is assessed for the respective images $y_1, \ldots, y_8$ constituting the out-of-focus image group and a weight coefficient sequence w is determined, weight coefficients corresponding to the images $y_3$ and $y_5$ decrease. However, when considering that, even in the images $y_3$ and $y_5$, a brightness change is smooth in regions where an object image is not present (a right-side region in the image $y_3$ and a left-side region in the image $y_5$), the weight coefficients of these regions need not be uniformly reduced. Instead, it is expected that generating an integrated image using, to the greatest extent feasible, data of regions where a brightness change is smooth increases the effects of random noise reduction and smoothing. Therefore, it can be said that a method of setting a weight coefficient in image units as described in the first to third embodiments has room for improvement.

In consideration thereof, in the present embodiment, an out-of-focus image group $y_1, \ldots, y_M$ is divided into a plurality of regions, an image group of each divided region is treated as an individual out-of-focus image group, and a weight coefficient sequence is individually determined. Accordingly, a smoothing effect of an integrated image is enhanced. To describe an example with reference to FIG. 7, the out-of-focus image group $y_1, \ldots, y_8$ is divided into left and right regions at a central dashed line, and the fixed-pattern noise reduction process described in the first to third embodiments are individually applied to each of an out-of-focus image group in the left region and an out-of-focus image group in the right region. Accordingly, estimation accuracy of fixed-pattern noise can be increased.

Hereinafter, as a simplest example of region division, a case of division into rectangular blocks respectively constituted by S-number of vertical pixels times S-number of horizontal pixels will be described.

FIG. 8 is a flow chart showing a fixed-pattern noise reduction process according to the present embodiment. In a region division process step S801, the image processing apparatus 110 divides each of the images $y_1, \ldots, y_M$ constituting the out-of-focus image group into regions of S×S pixels, and generates an out-of-focus image group for each region. In step S801, per-region out-of-focus image groups $y_{b,k} \in R^{S \times S}$ (k=1, . . . , M) can be generated. A subscript b denotes an identification number of a region, in which case b∈{1, . . . , T} is assumed. T denotes a total number of regions. A subscript k denotes a number corresponding to a focusing position of an image constituting an out-of-focus image group in a similar manner to the out-of-focus image group prior to division. Moreover, a size S of a divided region is to be determined in advance.

Subsequent region loops S802 and S804 represent loop end symbols and a region unit fixed-pattern noise reduction process step S803 is to be repeated until processing with respect to all region numbers b∈{1, . . . , T} is finished.

In the region unit fixed-pattern noise reduction process step S803, the image processing apparatus 110 performs a fixed-pattern noise reduction process on the out-of-focus image group of each region. The method described in the first to third embodiments can be applied for the fixed-pattern noise reduction process. As a result, out-of-focus image groups $x_{b,k} \in R^{S \times S}$ (k=1, . . . , M) in which fixed-pattern noise is reduced for each region are generated. Moreover, since the fixed-pattern noise reduction process of each region is an independent process, the fixed-pattern noise reduction processes with respect to a plurality of regions can be performed in parallel. Accordingly, processing can be performed at a higher speed.

Finally, in a region integration process step S805, the image processing apparatus 110 integrates the out-of-focus image groups $x_{b,k} \in R^{S \times S}$ (k=1, . . . , M) for each focusing position (k) and generates an out-of-focus image group $x_k \in R^{N \times N}$ (k=1, . . . , M) in which fixed-pattern noise is reduced.

As described above, by applying the fixed-pattern noise reduction process for each region, estimation accuracy of fixed-pattern noise of each region can be increased and, consequently, image quality of the out-of-focus image group $x_1, \ldots, x_M$ in which fixed-pattern noise has been corrected is improved.

Moreover, while an example of performing region division in units of rectangular blocks has been described in the present embodiment, units of region division are not necessarily limited to rectangular blocks. For example, region division may be performed in units of triangles or hexagons or in pixel units.

In addition, various modifications can be applied to the region division process of step S801. For example, a depth map D displaying a focusing position (a distance in an optical axis direction) where an object is present for each pixel or each small region may be used. For example, a region division process is also possible in which a region division method such as a division integration method is applied to the depth map D and regions in which positions in a depth direction where the object is present are relatively close to each other are consolidated. A depth map can be generated by, for example, determining a variation component (for example, an absolute value of a difference) with respect to a pixel value of a periphery for each pixel position in each image $y_1, \ldots, y_M$ constituting an out-of-focus image group and selecting a focusing position (k) with a largest variation component for each pixel position. Alternatively, the depth map D may be generated by other known methods such as a depth from focus (DFF) method and a depth from defocus (DFD) method.

In addition, in step S803, a weight coefficient sequence may be generated using the depth map D. Any method or function may be used to generate a weight coefficient sequence from the depth map D. For example, a weight coefficient sequence w for each divided region may be determined by the following expression.

$$(w)_k = \alpha(|k-k_D|+\gamma)^\beta (k=1, \ldots, M) \quad (30)$$

where $\alpha$ denotes a constant for adjusting a sum of weight coefficients $(w)_1$ to $(w)_M$ to 1, $k_D$ denotes an in-focus position to an object in a corresponding divided region, and k denotes a focusing position of an out-of-focus image group $y_k$. $\beta$ (>0) denotes a parameter for increasing a weight coefficient with respect to an image at a focusing position separated from the in-focus position $k_D$ of the object. $\gamma$ denotes a constant.

Since $|k-k_D|$ in Expression (30) represents a distance from the in-focus position $k_D$, as $\beta$ increases, a weight coefficient $(w)_k$ at a focusing position k that is separated from the in-focus position $k_D$ increases. $\beta$ can also be determined based on spacing between focusing positions when photographing an out-of-focus image group or on information regarding a size of focus blur at an adjacent focusing position which is determined by an imaging optical system. For example, when the spacing of focusing positions or focus blur is relatively large, since an image is sufficiently smooth at a focusing position slightly separated from the in-focus position $k_D$, a value of $\beta$ is set to a relatively small value. Conversely, when the spacing of focusing positions or focus blur is relatively small, since an image is not sufficiently smooth unless a focusing position is separated to some extent from the in-focus position $k_D$, a value of $\beta$ is set to a relatively large value. In other words, $\beta$ can be determined depending on the imaging optical system or imaging conditions.

In addition, in a similar manner to the case of Expression (3), an in-focus image may be intentionally excluded and an adjustment for changing a weight coefficient $(w)_k$ of a focusing position k where a distance $|k-k_D|$ from the in-focus position is equal to or shorter than a threshold to 0 may be performed in order to increase estimation accuracy of fixed-pattern noise. In this case, a value of $\alpha$ is to be recalculated so that a sum of weight coefficients after the adjustment equals 1.

Moreover, in the region division process, parts of adjacent divided regions may overlap each other. In this case, the overlapping regions may be integrated using weighted averaging or the like in the region division process. When a difference is created between adjacent regions due to an error in estimated fixed-pattern noise, the difference between regions can be made less conspicuous by providing such overlapping regions.

Fifth Embodiment

Methods of reducing fixed-pattern noise in an out-of-focus image group have been described in the previous embodiments. However, an application object of the present invention is not necessarily limited to an out-of-focus image group and the present invention is also applicable to moving image data.

Figure 9A:
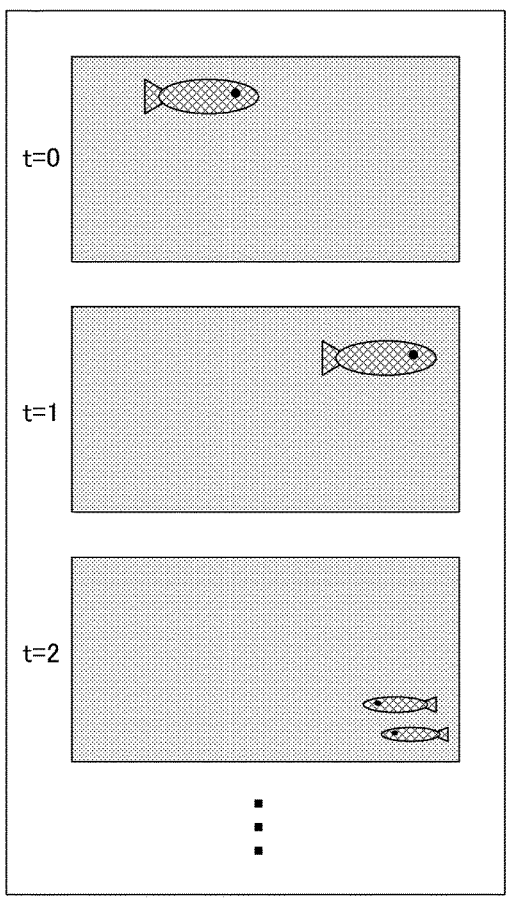
FIGS. 9A and 9B show an example of moving image data in which fixed-pattern noise can be reduced.
Figure 9B:
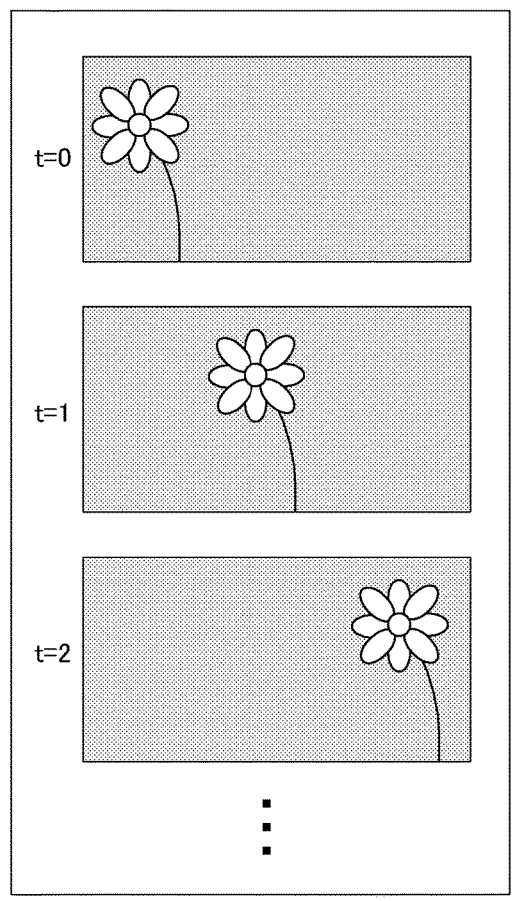

FIGS. 9A and 9B show an example of moving image data in which fixed-pattern noise can be reduced using the fixed-pattern noise reduction process according to the present embodiment.

FIG. 9A shows a part of a group of images constituting a moving image of swimming fish having been photographed by a fixed camera. Water of the sea or a fish tank is captured in the background. t=0, t=1, and t=2 on the left side of the images represent differences in photography times and fish are moving in the water. FIG. 9B shows a part of a group of images constituting a moving image of a flower that is a still object having been photographed by moving a camera with time. The sky is captured in the background. t=0, t=1, and t=2 represent differences in photography times and a position of the flower changes in each image. Although not illustrated, both pieces of moving image data is not limited to three images (frames) and are constituted by a large number (M number) of images (frames) which change over time. When observed per region, the group of images is constituted by a small number of images with high sharpness and a large number of smooth images. In addition, supposing that a plurality of images with high sharpness are present in a group of images constituted by a plurality of images, images of the object are to be totally different images. Therefore, the sharpness is likely to cancel each other and weaken when a large number of images are integrated. The fixed-pattern noise reduction processes described in the first to fourth embodiments can also be applied to a group of images such as that described above.

Hereinafter, a case where the fixed-pattern noise reduction process described in the first embodiment is applied will be described.

The image processing apparatus 110 acquires moving image data $y_t \in R^{N \times N}$ (t=1, ..., M) from the imaging apparatus 120, the storage apparatus 113, or the other computer system 114. The image processing apparatus 110 executes the fixed-pattern noise reduction process using a fixed-pattern noise reduction process program stored in the RAM 302 or the ROM 303.

Hereinafter, a process of reducing fixed-pattern noise in moving image data $y_1, \ldots, y_M$ will be described with reference to the flow chart shown in FIG. 5. Moreover, favorably, a user can set, in advance, which of additive fixed-pattern noise and multiplicative fixed-pattern noise is to be removed with a setting (not shown) of the fixed-pattern noise reduction process program.

In the weight coefficient generation step S501, the image processing apparatus 110 acquires the moving image data $y_1, \ldots, y_M$ to which fixed-pattern noise of an image sensor has been added as input images and generates a weight coefficient sequence w corresponding to respective images (respective frames). As described in the first embodiment, the weight coefficient sequence w is determined using, for example, Expression (3).

In the integrated image generation step S502, using the weight coefficient sequence w calculated in step S501 and the moving image data $y_1, \ldots, y_M$, the image processing apparatus 110 generates an integrated image c. In the smoothing step S503, the image processing apparatus 110 applies smoothing to the integrated image c and generates a smoothed integrated image c'. As described earlier, various filtering processes and optimization processes can be used for the smoothing.

Next, in the fixed-pattern noise estimation process step S504, the image processing apparatus 110 generates estimated fixed-pattern noise n' based on a difference between the integrated image c and the smoothed integrated image c'. In the fixed-pattern noise correction process step S505, using the estimated fixed-pattern noise n', the image processing apparatus 110 generates moving image data $x_t \in R^{N \times N}$ (t=1, ..., M) in which fixed-pattern noise has been reduced.

Using the fixed-pattern noise reduction process described above in the present embodiment enables fixed-pattern noise included in moving image data to be reduced.

Since the number of images (number of frames) M in a time direction becomes extremely large in moving image data, the moving image data may be divided for every prescribed time or every prescribed number of frames, and each division may be treated as an input image to be independently subjected to a fixed-pattern noise reduction process. In addition, as described in the fourth embodiment, dividing an image in a spatial direction and performing a fixed-pattern noise reduction process for each region is also favorable.

Other Embodiments

The first to fifth embodiments described above merely represent specific examples of the present invention and are not intended to limit the scope of the present invention to the configuration of the embodiments. The configurations of the respective embodiments may be appropriately modified and the embodiments may be combined insofar as no technical contradictions arise.

While only cases where an out-of-focus image group or moving image data is constituted by a single channel have been described in the first to fifth embodiments, a fixed-pattern noise reduction process can also be applied in a case of a color image (for example, RGB) constituted by a plurality of color channels. For example, a fixed-pattern noise reduction process can be applied for each color channel.

The present invention can also be achieved by supplying a program that realizes one or more functions of the embodiments described above to a system or an apparatus via a network or a storage medium and having one or more processors in a computer in the system or the apparatus read and execute the program. Alternatively, the present invention can also be achieved by a circuit (for example, an ASIC) which realizes one or more functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-234814, filed on Dec. 1, 2015, which is hereby incorporated by reference herein in its entirety.

What is claimed is:

1. An image processing method, comprising:
a weight coefficient generation step in which a computer generates, based on data of a plurality of images acquired by performing imaging using a same image sensor, a weight coefficient corresponding to each image so that a weight coefficient corresponding to an image of which a brightness change is smoother than a brightness change of another image is larger than a weight coefficient corresponding to the another image;
an integrated image generation step in which a computer integrates the data of the plurality of images using the weight coefficients to generate data of an integrated image;
a smoothing step in which a computer applies smoothing to the data of the integrated image to generate data of a smoothed integrated image; and
a fixed-pattern noise estimation step in which a computer generates, based on the data of the integrated image and the data of the smoothed integrated image, data of estimated fixed-pattern noise which is an estimated value of fixed-pattern noise attributable to the image sensor.

2. The image processing method according to claim 1, wherein the data of the plurality of images is data of a plurality of images acquired by imaging an object while differentiating focusing positions in an optical axis direction of an imaging optical system.

3. The image processing method according to claim 2, wherein the imaging optical system is a double-telecentric optical system.

4. The image processing method according to claim 2, wherein the imaging optical system is an optical system constituting a microscope.

5. The image processing method according to claim 1, wherein the data of the plurality of images is data of a plurality of frames constituting a moving image.

6. The image processing method according to claim 1, wherein in the weight coefficient generation step, the weight coefficient corresponding to each image is generated so that the weight coefficient has a negative correlation with sharpness of the image.

7. The image processing method according to claim 6, wherein the sharpness of the image is determined based on a standard deviation of brightness of the image.

8. The image processing method according to claim 6, wherein in the weight coefficient generation step, a weight coefficient corresponding to an image of which the sharpness is equal to or higher than a threshold is set to 0.

9. The image processing method according to claim 1, wherein in the weight coefficient generation step, the weight coefficient corresponding to each image is generated so that the weight coefficient has a positive correlation with a distance between a focusing position of the image and an in-focus position of the image.

10. The image processing method according to claim 9, wherein in the weight coefficient generation step, a weight coefficient corresponding to an image of which a distance between the focusing position of the image and the in-focus position of the image is equal to or shorter than a threshold is set to 0.

11. The image processing method according to claim 1, wherein in the weight coefficient generation step, the weight coefficient corresponding to each image is generated so that a sum of weight coefficients corresponding to the plurality of images equals 1.

12. The image processing method according to claim 1, wherein in the integrated image generation step, the data of the integrated image is generated by subjecting data of the plurality of images to weighted averaging using the weight coefficients.

13. The image processing method according to claim 1, wherein the smoothing is a noise reduction process based on iterative calculations.

14. The image processing method according to claim 1, wherein the smoothing is a filtering process using a smoothing filter.

15. The image processing method according to claim 1, wherein in the fixed-pattern noise estimation step, the data of the estimated fixed-pattern noise is generated by calculating a difference between the data of the integrated image and the data of the smoothed integrated image.

16. The image processing method according to claim 1, further comprising:
a fixed-pattern noise correction step in which a computer reduces, based on the data of the estimated fixed-pattern noise, fixed-pattern noise which is attributable to the image sensor and which is included in the data of each of the plurality of images.

17. The image processing method according to claim 16, wherein in the fixed-pattern noise correction step, the data of the plurality of images in which fixed-pattern noise has been reduced is generated by subtracting the data of the estimated fixed-pattern noise from the data of each of the plurality of images.

18. The image processing method according to claim 16, wherein in the fixed-pattern noise correction step, data of an estimated gain representing a variation of gain of the image sensor is generated based on data of the estimated fixed-pattern noise.

19. The image processing method according to claim 18, wherein the data of the plurality of images in which fixed-pattern noise has been reduced is generated by dividing the data of each of the plurality of images by the data of the estimated gain.

20. The image processing method according to claim 18, wherein the data of the plurality of images in which fixed-pattern noise has been reduced is generated by subtracting, from the data of each of the plurality of images, data obtained by multiplying the data of each of the plurality of images by the data of the estimated gain.

21. The image processing method according to claim 1, further comprising:
a region division step in which a computer divides each of the plurality of images into a plurality of regions,
wherein the generation of the weight coefficients, the generation of the integrated image, the generation of the smoothed integrated image, and the generation of the estimated fixed-pattern noise are individually performed for each of the plurality of regions.

22. The image processing method according to claim 1, wherein the weight coefficient generating step determines the smoothness of the brightness change of an image in accordance with sharpness of the image.

23. The image processing method according to claim 22, wherein sharpness is determined in accordance with a standard deviation of brightness of the image.

24. A non-transitory computer-readable storage medium storing a program that causes a computer to execute respective steps of an image processing method, the image processing method comprising:
a weight coefficient generation step in which a computer generates, based on data of a plurality of images acquired by performing imaging using a same image sensor, a weight coefficient corresponding to each image so that a weight coefficient corresponding to an image of which a brightness change is smoother than a brightness change of another image is larger than a weight coefficient corresponding to the another image;
an integrated image generation step in which a computer integrates the data of the plurality of images using the weight coefficients to generate data of an integrated image;
a smoothing step in which a computer applies smoothing to the data of the integrated image to generate data of a smoothed integrated image; and
a fixed-pattern noise estimation step in which a computer generates, based on the data of the integrated image and the data of the smoothed integrated image, data of estimated fixed-pattern noise which is an estimated value of fixed-pattern noise attributable to the image sensor.

25. An image processing apparatus, comprising:
a weight coefficient generation unit configured to generate, based on data of a plurality of images acquired by performing imaging using a same image sensor, a weight coefficient corresponding to each image so that a weight coefficient corresponding to an image of which a brightness change is smoother than a brightness change of another image is larger than a weight coefficient corresponding to the another image;
an integrated image generation unit configured to integrate the data of the plurality of images using the weight coefficients to generate data of an integrated image;
a smoothing unit configured to apply smoothing to the data of the integrated image to generate data of a smoothed integrated image; and
a fixed-pattern noise estimation unit configured to generate, based on the data of the integrated image and the data of the smoothed integrated image, data of estimated fixed-pattern noise which is an estimated value of fixed-pattern noise attributable to the image sensor.

26. An image processing method, comprising:
a weight coefficient generation step in which a computer generates, based on data of a plurality of images acquired by performing imaging using a same image sensor, a weight coefficient corresponding to each image;
an integrated image generation step in which a computer integrates the data of the plurality of images using the weight coefficients to generate data of an integrated image;
a smoothing step in which a computer applies smoothing to the data of the integrated image to generate data of a smoothed integrated image; and
a fixed pattern noise estimation step in which a computer generates, based on the data of the integrated image and the data of the smoothed integrated image, data of estimated fixed pattern noise which is an estimated value of fixed pattern noise attributable to the image sensor.

27. The image processing method according to claim 26, wherein in the weight coefficient generation step, the weight coefficient corresponding to each image is generated so that the weight coefficient has a negative correlation with sharpness of the image.

28. The image processing method according to claim 27, wherein the sharpness of the image is determined based on a standard deviation of brightness of the image.

* * * * *